UNITED STATES PATENT OFFICE.

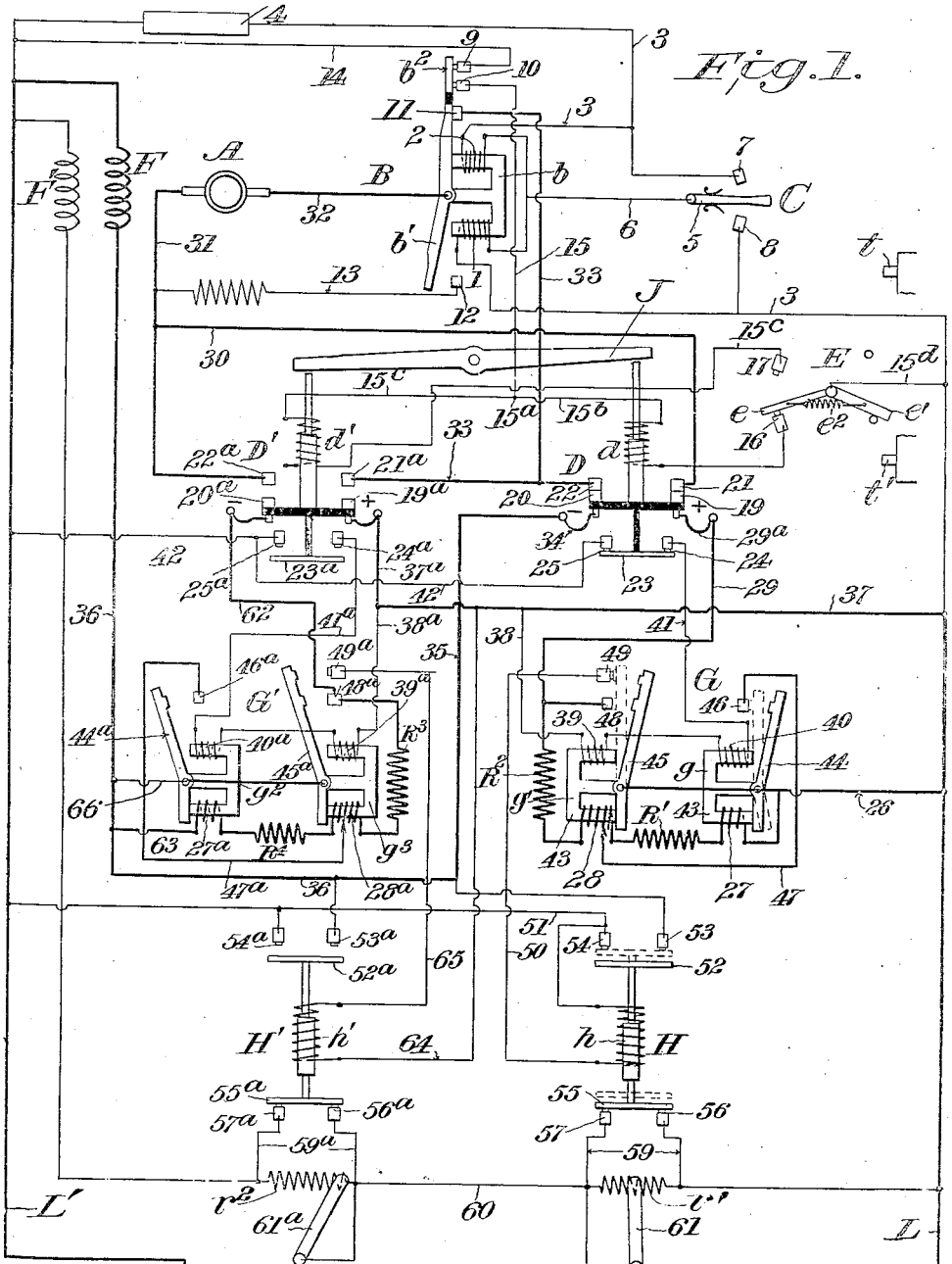

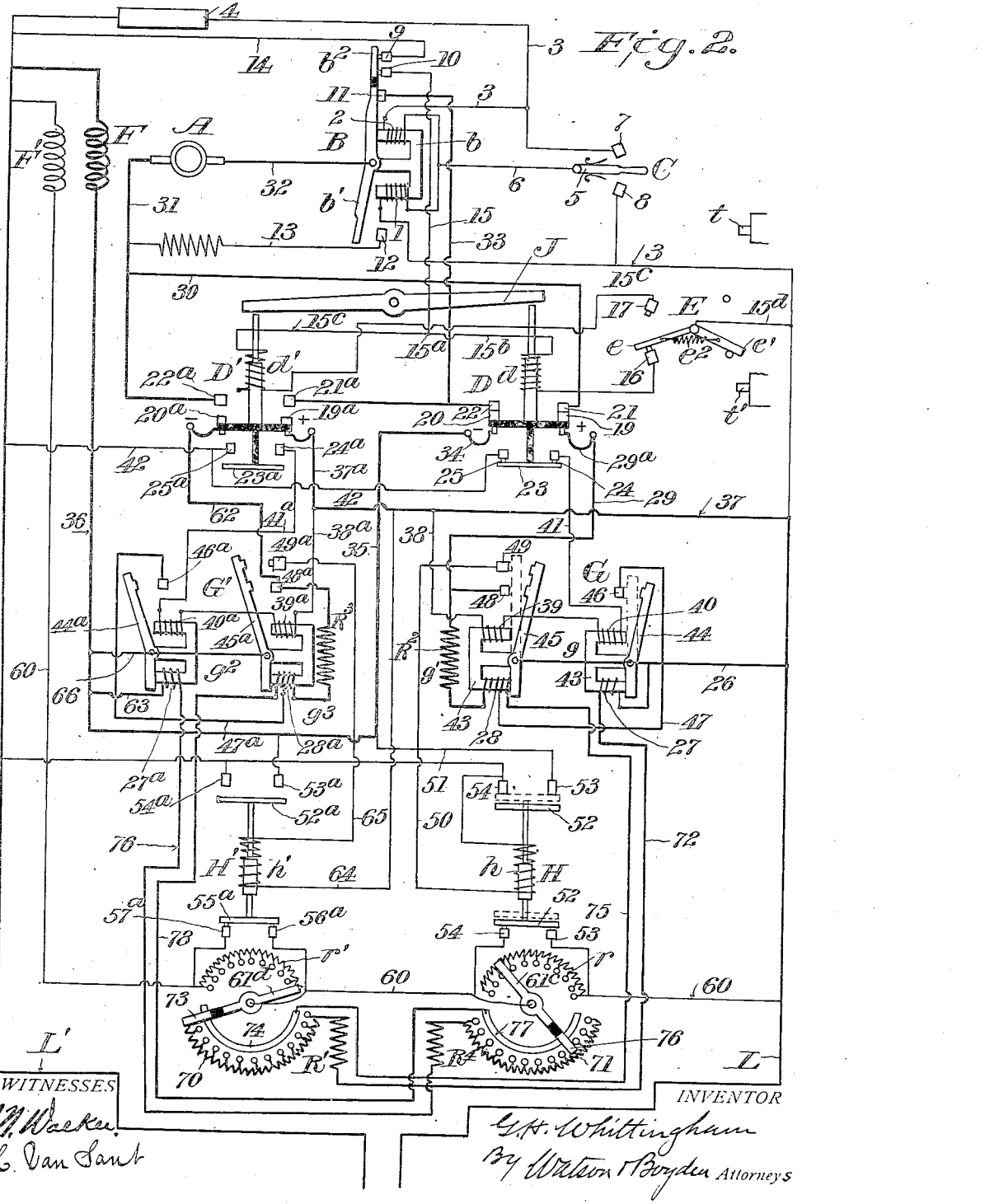

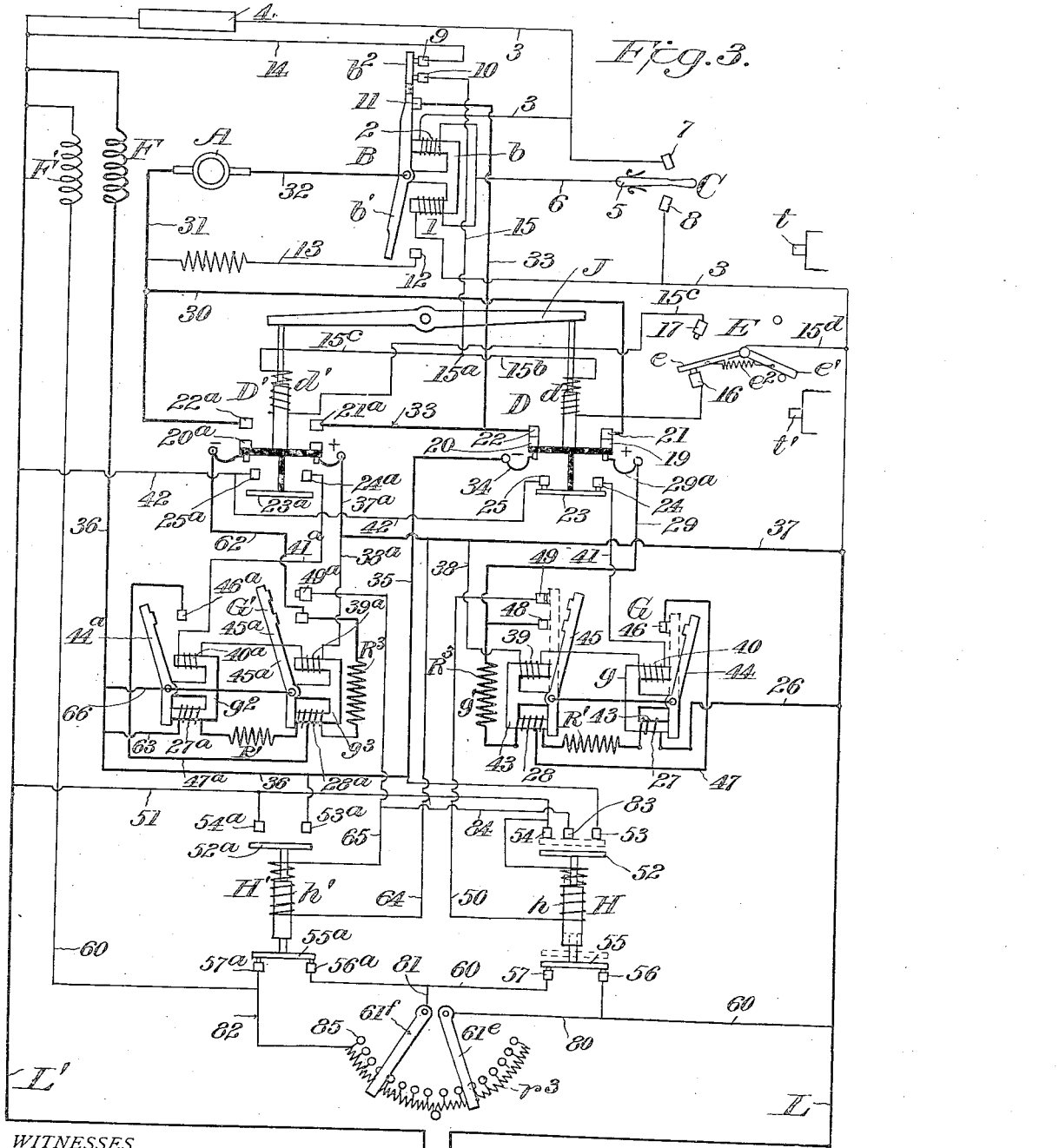

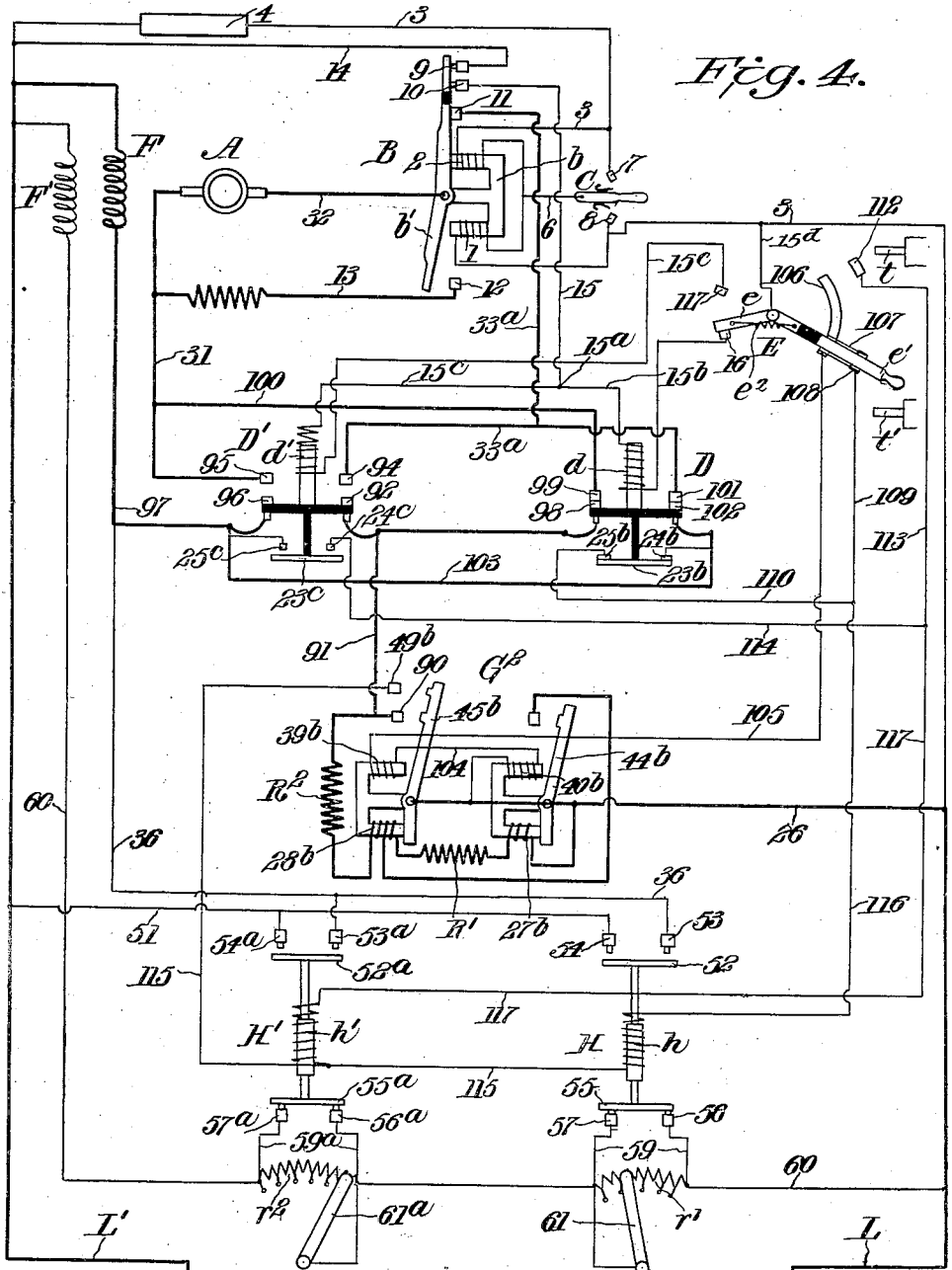

GEORGE H. WHITTINGHAM, OF BANCROFT PARK, MARYLAND, ASSIGNOR TO MONITOR MANUFACTURING COMPANY OF BALTIMORE CITY, OF BALTIMORE, MARYLAND, A CORPORATION OF MARYLAND.

MOTOR-CONTROL SYSTEM.

1,124,189.        Specification of Letters Patent.        Patented Jan. 5, 1915.

Application filed August 28, 1912. Serial No. 717,625.

*To all whom it may concern:*

Be it known that I, GEORGE H. WHITTINGHAM, a citizen of the United States, residing at Bancroft Park, in the county of Baltimore and State of Maryland, have invented certain new and useful Improvements in Motor-Control Systems, of which the following is a specification.

The purpose of this invention is to provide improved means for controlling electric motors used in situations where the motor must be frequently reversed, as, for instance when the motor drives a planing machine and it is required that the direction of rotation of the motor armature shall be reversed at the completion of each movement of the planer bed, in order to reverse the direction of movement of the bed. Usually, for such work, the motor armature is slowed down at the end of each movement of the planer bed, prior to reversal of the armature current, by means of a brake, either mechanical or electrodynamic; but this entails a loss of time at the end of each stroke, and it is also found that the work done by the cutting tool, when the brake is used, is not as smooth and even as the rest of the cut.

In carrying out my invention, I provide means for automatically reversing the current in the armature circuit while the armature is running at normal speed, or at any desired speed above the normal, without injury to the motor, whereby the armature quickly slows down and then acquires its speed in the opposite direction without the jarring action which results from the use of a brake and with a saving in time at each reversal which very greatly increases the working capacity of the driven machine.

In the accompanying drawings which illustrate my invention, with several modifications, Figure 1 is a diagram illustrating a control system embodying a reversing mechanism, controlled through the operation of the driven machine, two starters controlled by the reversing mechanism and each having a resistance in excess of the normal starting resistance, and two field switches controlled by the starters; Fig. 2 is a diagram substantially like Fig. 1 with the addition of means for adjusting the extra armature resistance of each starter to correspond to the speed of the armature above the normal at the time of reversal of the armature current; Fig. 3 is a diagram the same as that shown in Fig. 1, except as to the connections of the field rheostat and the field controlling switches; and, Fig. 4 is a diagram showing a modification in which only a single starter is used.

In Fig. 1 of the drawing, A indicates the armature of the motor, F the series field winding and F' the shunt field winding of the motor, the latter being permanently connected to the supply wires L, L'. A master-switch B is provided for connecting the side L' of the supply circuit with one side of the armature, and this master-switch is operable from a distance by means of a start-and-stop switch C, which may be located at a convenient point adjacent the machine which the motor drives. The master-switch, which remains closed except when it is desired to stop the motor, also makes up a circuit through the controlling magnets $d$, $d'$ of direction-switches D, D', to a tappet switch E, which is moved by tappets $t$, $t'$ on the planer, or other driven machine, to close the circuit through said magnets alternately. These direction-switches, together, constitute a reversing switch for changing the direction of flow of current through the armature of the motor, to reverse its direction of rotation, at each operation of the tappet switch. Two independent starters, G and G', each having more than the normal starting resistance, are connected alternately in series with the armature upon the operation of the direction switches D, and D', respectively, and field controlling switches, H and H', controlled by said starters, operate to insert resistance in the shunt field and to short circuit the series field whenever the starting resistance is cut out of the armature circuit.

Referring to the parts and their connections more in detail, the master-switch B comprises an E-shaped magnet $b$, upon the central pole of which is hinged a rocking switch arm $b'$. The end pole pieces of the magnets are surrounded by coils 1 and 2 which are connected by conductor 3, through a dead resistance 4 to the supply wires L, L'. The lever 5 of the start-and-stop switch C is connected by conductor 6 to a point in the conductor 3 between the coils 1 and 2 and the contacts 7 and 8 of said switch are connected to the conductor 3 at points outside the coils, as shown in the drawing. It will be evident that moving the switch lever 5 on to the contact 8 will cause the coil 1 to become short circuited, and the coil 2 will then rock the switch arm $b$ to closed position against the contacts 9, 10 and 11, where it will be held by the magnetic force of the pole formed by the coil 2; whereas, moving the switch arm 5 onto the contact 7, will short circuit the coil 2 and the coil 1 will then rock the lever $b'$ to open position and cause it to engage the contact 12 of a dynamic-brake circuit 13. It is evident that only a momentary contact of the lever 5 with one of the contacts 7 or 8 will be necessary to throw the switch arm $b'$, and that when the arm 5 is returned to the central position the switch arm $b'$ will remain where set because of its closer proximity to one pole of the magnet $b$ than to the other.

The switch B, when once closed to start the motor remains closed until it is desired to stop, notwithstanding repeated reversals of the motor armature, the function of this master-switch being to complete the armature circuit to one side of the supply circuit, to make up the circuit for the magnets and tappet switch controlling the reversing mechanism, and to close the dynamic-brake circuit whenever it may be desirable to stop the motor, as, for instance, when the planing operation has been finished, or when it is desired to move the planer bed a short distance, less than the full stroke for which the tappets on the planer bed are set.

The arm $b'$ of the master-switch B has a section $b^2$, insulated from the rest of the arm, for bridging the contacts 9 and 10 when the switch is closed. These contacts are in the control circuit for the direction switches D, D', which circuit includes the tappet switch E, and is traced as follows: From the supply wire L' through conductor 14 to the contact 9, through bridge piece $b^2$, when the master-switch is closed, to contact 10, thence through conductor 15 to the point 15$^a$, where the circuit divides, one part 15$^b$ extending through magnet winding $d$, to the contact 16 of the tappet switch E, and the other part 15$^c$ extending through magnet $d'$ to the contact 17 of the switch E. The switch E comprises a blade $e$ and a handle $e'$, pivotally connected end to end, and connected by a spring $e^2$ which holds the blade against one contact until the handle is moved far enough to carry the spring over the pivoted point of the switch, when the blade quickly moves into engagement with the other contact and remains there until the handle is moved far enough in the reverse direction to carry the spring again over the pivotal point of the switch. Thus the blade of the switch E will always remain in engagement with one or the other of its contacts, except for an instant during reversal. The blade $e$ is connected by wire 15$^d$ with the side L of the supply circuit, so that, when the master switch B is closed, current will flow through one or the other of the coils, $d$, $d'$ according to the position of the blade of the tappet switch E.

In the position of the tappet switch shown in the drawing, its blade being in engagement with the contact 16, the coil $d$ of the switch D is energized, and the core 18, within the coil is held in its upper position, with the contacts 19 and 20, carried by the core, in engagement with the stationary contacts 21 and 22, respectively, and with the metal bridge-piece 23, also carried by the core, in engagement with the stationary contacts 24 and 25.

The direction-switch D, when first closed, completes two circuits. The first circuit completed is the armature circuit, which leads from the supply wire L through conductors 26 and series coil 27 on starter G, thence through resistance section R', thence through series coil 28, thence through a second section R$^2$ of resistance, thence by conductor 29 and flexible cable 29$^a$ to the contact 19, thence to contact 21 and by conductors 30 and 31 to the armature A, thence by conductor 32 to the arm $b'$ of the master-switch B, thence through contact 11 to conductor 33 to contacts 21$^a$ and 22. From contact 22, and its engaging contact 20 the armature circuit continues through cable 34, conductors 35 and 36 to the series field winding F of the motor, and thence to the side L' of the supply circuit.

The other circuit closed by the operation of the direction-switch D, immediately after the completion of the armature circuit, is as follows: From the supply wire L through conductors 37 and 38 and shunt coils 39 and 40 on the starter elements $g'$, $g$ to conductor 41 and contact 24, thence through bridge-piece 23 to contact 25, and from the latter contact through conductor 42 to the supply wire L'.

The starter elements $g$ and $g'$ are alike, except that the coil 28 on the latter element has a greater length of wire than the coil 27 on the element $g$. Each element, as shown, comprises an E-shaped magnet 43 upon the outer arms of which the shunt and series coils are wound, while on the central poles are pivoted the switch arms 44 and 45 which rock by gravity to the open positions whenever the current is cut off by the opening of the switch D. As the armature circuit, which includes the series coils 27 and 28, is closed in advance of the circuit which includes the shunt coils 39 and 40, the switch arms will be held open while the starting current, flowing in the series coils, is above predetermined limits, but as the starting current falls, the shunt coils will overcome the attractive force of the series coils and close the switches, and hold them in closed positions so long as the direction switch D remains closed. As the current falls the switch arm 44 first closes, as its series coil 27 has fewer turns of wire than the series coil 28, and in closing, the arm 44, which is connected to the supply circuit by conductor 26, engages a contact 46, connected by conductor 47 to a point intermediate the ends of the coil 28 on the starter element $g'$, and thus the series coil 27 on the element $g$, the section $R'$ of starting resistance, and a portion of the windings of the series coil 28 become short circuited. Thereafter, when the starting current is below a predetermined value, the attractive force of the coil 28 becomes weakened and the shunt coil 39 on the element $g'$ moves the armature 45 to its closed position, thus short-circuiting the series coil 28 and the resistance section $R^2$ by reason of the engagement of the arm 45, which is connected to the supply wire L by the wire 26, with a contact 48 which is connected to the conductor 29, as shown.

The switch arm 45 cannot close to cut out the second section of the starting resistance until the armature has attained its normal speed, with full field strength, and the current in the armature circuit is normal. The closing of said switch arm brings into operation a field-controlling switch H, which acts to insert a predetermined amount of resistance in series with the shunt field winding $F'$ of the motor, and to short circuit the series field winding F, thus weakening the field of the motor and causing the armature of the motor to turn at a predetermined speed above the normal. The control circuit which the switch arm 45 closes extends from the supply wire L through conductor 26 to said switch arm, thence to the stationary contact 49 and by conductor 50 to solenoid $h$ of switch H, thence by conductor 51 to the supply wire $L'$. The completion of this circuit causes the solenoid $h$ to lift its core and the bridge-piece 52, carried by said core, engages contacts 53 and 54, connected to the conductors 36 and 51 which lead to the terminals of the series field coil F. Thus, said series coil becomes shunted. The core of the solenoid $h$ carries, also, another bridge-piece 55, which normally engages contacts 56 and 57 and completes a shunt circuit 59 around the variable resistance $r'$ included in the shunt field circuit 60 of the motor. Hence, normally, this resistance is not included in the shunt field, but as soon as the solenoid $h$ is energized and the bridge piece 57 is lifted, the resistance $r'$ becomes included in the shunt field circuit and weakens the field.

The shunt field $F'$, of the motor, is permanently connected to the supply wires L, $L'$, through circuit 60, as shown, and in this circuit are arranged the two variable resistances, $r'$ and $r^2$, which are normally short circuited by the field regulating switches H and $H'$. The switch H operates, as just described, to include the resistance $r'$ in the shunt field, when the motor has attained normal speed in one direction, and the switch $H'$ operates to include the resistance $r^2$ when the motor has attained normal speed in the opposite direction, as hereinafter explained, but the two field resistances are never interposed in the shunt field at one time. The purpose of providing two field resistances is to provide for operating the armature at a higher speed in one direction than the other, as desirable, for instance, in operating planer beds on the cutting and return strokes.

From the foregoing description it will be clear that, the master-switch being closed, if the tappet-switch E is closed against the contact 16 by one movement of the planer bed, the direction-switch D will close the armature circuit through the starter G and also close a circuit through the shunt coils of the starter, and after said starter has operated to cut out its resistance sections, the field controlling switch H will operate to short circuit the series field winding F and also to insert more or less of the resistance $r'$ in the shunt field circuit of the motor, depending upon the position of the contact arm 61.

Near the end of the next movement of the planer bed the blade of the tappet switch E will be moved out of engagement with the contact 16 and immediately into engagement with the contact 17. The solenoid $d$ of the direction switch D will thus be deënergized and the solenoid $d'$ of the direction-switch $D'$ will be energized. When the solenoid $d$ is deënergized, it will be evident that the armature circuit will be broken at the contacts 19—21, 20—22 and that the shunt or holding coils 39 and 40 on the starter G will be deënergized, allowing the switch arms 44 and 45 of said starter to rock to normal positions, and the opening movement of the arm 45 will interrupt the circuit through the solenoid coil of the field-controlling switch H, which switch will move to open the bridge around the series field winding of the motor, and to form a bridge around the field resistance $r'$.

The direction switch $D'$, starter $G'$ and field-controlling switch $H'$ are duplicates of the mechanisms D, G, and H, and are brought into action when the tappet switch blade engages the contact 17, to direct the current through the armature in the opposite sense, and to control the starting and acceleration of the armature in the opposite direction. A centrally pivoted lever J may be arranged between the movable members of the direction switches D and D' to insure the opening of one switch before the other closes.

The instant the blade of the tappet switch engages the contact 17, a circuit is completed from the line L through the tappet switch to conductor $15^c$, solenoid $d'$ of direction switch D', conductor 15, contacts 10 and 9 and conductor 14 to the line L'. The core of the solenoid lifts and completes the armature circuit at the contacts $21^a$, $19^a$, and $20^a$, $22^a$, and then the bridge-piece $23^a$ bridges the contacts $24^a$ and $25^a$ and thereby closes a circuit through the shunt or holding coils $39^a$ and $40^a$ on the starter elements $g^2$, $g^3$ of the starter G'. The armature circuit thus completed extends from supply wire L through conductors 37 and $37^a$ to contacts $19^a$ and $21^a$, thence through conductor 33 to contact 11 and the arm $b'$ of the master-switch, thence through conductor 32 to the motor armature A, thence by conductor 31 to contacts $22^a$ and $20^a$, thence by conductor 62 to contact $48^a$ of starter G', thence, successively, through resistance section $R^3$, series coil $28^a$, resistance section $R^4$, series coil $27^a$ and conductors 63 and 36 to the series field winding F of the motor, thence to the line wire L'. The circuit through the shunt windings of the starter G', which is completed by the operation of the direction switch D' is as follows: From line wire L through conductors 37 and $38^a$ to the shunt coils $39^a$ and $40^a$, thence by conductor $41^a$ to contact $24^a$, bridge-piece $23^a$ and contact $25^a$ and thence by conductor 42 to the supply wire L'.

The starter G' will operate in the same way as the starter G, the switch arm $44^a$ first closing against contact $46^a$ and short-circuiting the coil $27^a$, resistance section $R^4$ and a portion of the winding $28^a$, through conductor $47^a$, and switch arm $45^a$ then closing against contact $48^a$, thus short-circuiting the remaining active windings of the coil $28^a$ and the resistance section $R^3$, and also engaging contact $49^a$, which completes a circuit through the solenoid $h'$ of the field-controlling switch H'. This latter circuit extends from line L through conductors 37 and 64 to solenoid $h'$, thence through conductor 65 to contact $49^a$, switch arm $45^a$ and conductors 66 and 36 to the series field winding F of the motor, and thence to the supply wire L'. The completion of this last mentioned circuit causes the field-controlling switch H' to move upward and the bridge-piece $52^a$ thereon engages contacts $53^a$ and $54^a$ connected, respectively, to the wires 36 and 51, and the series field winding F of the motor thereby becomes short circuited. The bridge-piece $55^a$ is also lifted away from the contacts $56^a$ and $57^a$, and the shunt circuit $59^a$, around the field resistance $r^2$ is thereby broken and the resistance $r^2$, or a predetermined portion of it, becomes included in series with the shunt field F' of the motor. The contact arm $61^a$ may be set at any desired point, and this will determine the amount of resistance automatically included in the shunt field circuit when the switch H operates.

It will be plain from the foregoing that, as the tappet switch moves alternately back and forth from one of its contacts to the other, the set of devices D, G and H will operate alternately with the set of devices D', G' and H', and that as the elements of each set of devices instantly drop to normal positions when the tappet switch breaks the circuit through the solenoid of the direction switch of that set, the closure of the tappet switch in one direction or the other will always find the corresponding direction switch, starter and field switch in initial or normal positions.

With this apparatus, contrary to the usual practice, the motor armature is not slowed down or stopped prior to reversing the current in its circuit. When the armature is running at full speed in one direction, the tappet switch is thrown, causing an immediate reversal of the current in the armature circuit, and at the moment of the reversal of the current the electromotive force generated by the armature, running under its own momentum and the momentum of its load, is added to the impressed electromotive force of the supply circuit, thus making the voltage at the terminals of the armature circuit much greater than the normal voltage of the supply circuit, at the time the current is reversed. This would cause a destructive quantity of current to flow through the armature circuit were it not for the fact that each starter is provided with a sufficient amount of resistance, additional to the normal starting resistance, to compensate for the increased voltage at the terminals of the armature circuit at the time of reversal of the armature current and to limit the quantity of current flowing at such time to a safe amount, preferably the maximum starting current. It will be evident that the extra resistance required will vary according to the speed of the motor at the time of reversal of the armature current. This maximum starting current, flowing through the series windings of the starter, will cause both switch arms of the starter G, or G', as the case may be, to be held open, thereby maintaining both sections of starting resistance in circuit for the moment. But, the armature quickly slows down under the action of the reverse current in its circuit, and as it slows down its electromotive force in the direction of the line e. m. f. decreases to zero, thus reducing the voltage at the terminals of the armature circuit to normal, after which the armature starts to rotate in the opposite direction and generates a counter-electromotive force opposed to the line electromotive force. The series coils 27 and 27ª of the starters are wound so that with the maximum starting current flowing therein, the switch arms 44 and 44ª will be held open, but with any current less than the maximum starting current flowing in these coils the switch arms will be released and will be moved to closed position by the shunt coils 40, 40ª. Hence, after the current has been reversed in the armature circuit, by the closure of the direction switch D, for instance, both switch arms, 44 and 45, of the starter G will be, at first, held open, but as the armature slows down, causing the abnormal voltage in its circuit to decrease, the current flow will also decrease and the coil 27 will release the switch arm 44, permitting the latter to close and short circuit the section R' of resistance and a portion of the windings of the coil 28. This will leave in series with the armature only the resistance section R² and a portion of the windings of the coil 28. The resistance section R² is proportioned as it would be for starting the motor from a state of rest and the windings of the coil 28 remaining in circuit are proportioned so as to permit the switch arm 45 to close when the starting current has fallen to a safe limit, which is practically the normal full load current of the motor. In practice, the rotation of the armature under its own momentum, opposed by the reverse current, quickly subsides and the armature immediately starts off in the opposite direction with the single step of resistance R² in circuit, and this is cut out automatically when the armature attains normal speed in the latter direction, after which the field-controlling switch H operates to short circuit the series field and to introduce the resistance r' into the shunt field of the motor.

It will be evident that upon the next movement of the tappet switch the devices D', G' and H' will come into action and operate in the same way as the devices D, G and H to reverse the direction of movement of the armature. It will also be evident that by adjusting the resistance arms 61, 61ª, the armature may be made to run at the same speed or at different speeds in both directions.

Each of the starters, G and G', it will be seen, is composed of two starter elements each controlling a section of resistance which would suffice for starting the motor from a state of rest, the resistance sections and the series coils of the two starter elements being connected in series in the armature circuit, both elements coöperating to prevent excessive current flow under the abnormal voltage which prevails when the current is reversed with the armature running at high speed in one direction, and one element preventing excessive current flow when the voltage becomes normal and while the armature is gaining speed in the opposite direction of movement.

The start-and-stop switch C and the tappet switch E are preferably mounted upon the same base, although shown separately in the diagram. If desired, at any time the motor may be reversed at will by the manual operation of the tappet switch and it may be stopped by moving the lever of the switch C momentarily on to the contact 7 of the start-and-stop switch.

In Fig. 2 of the drawing is shown an arrangement whereby the extra resistance associated with each starter is adjusted simultaneously with the adjustment of the field resistance controlled by the other starter. This arrangement is very desirable where the motor is operated at speeds much above the normal speed at which it operates with full field strength. Thus, modern motors which operate at low speed, with full field strength, are constructed so that the speed may be increased up to four or five times the normal speed by weakening the field. Hence, if the current in the armature circuit of such a motor is reversed while it is running at its highest speed, the voltage, for the moment, at the terminals of the armature circuit might be four or five times greater than the normal voltage of the supply circuit, and hence it is necessary to introduce into the starter which comes into action upon reversal of the current, a sufficient amount of extra resistance to restrict the quantity of current flowing through the armature to a safe limit until the armature practically stops its rotation in one direction, when it will start off in the opposite direction with only the normal starting resistance in circuit.

In Fig. 2, the arrangement of elements and circuits is the same as in Fig. 1 except that the extra resistance R' has a variable portion 70, and the amount of this variable portion in circuit is adjustable by means of the lever 61ᵈ which regulates the field resistance r', controlled by the field controlling switch H', and the extra resistance R⁴ has a variable portion 71 which is adjusted by the arm 61ᶜ controlling the field resistance r, which field resistance is in turn controlled by the field switch H. As shown in the drawing, instead of connecting the two terminals of the extra resistance R' directly to the series coils 27 and 28 of the starter G, as shown in Fig. 1, a conductor 72, forming part of the armature circuit, extends from the coil 27 to the fixed resistance R' and thence through the variable extension 70 thereof, and an insulated contact piece 73 on the arm 61ᵈ connects the contact piece of this variable resistance with an arcuate contact piece 74, which in turn is connected by conductor 75 to the series coil 28 of the starter element $g'$. Similarly, the extra resistance $R^4$, associated with the starter $G'$, is connected by a conductor 76 with the coil $27^a$ of the latter starter, and the variable portion 71 of said resistance is connected by contact piece 76 on the lever $61^c$ with an arcuate contact piece 77, which latter is connected by conductor 78 to one end of the series coil $28^a$ on the starter element $g^3$.

In operation the levers $61^c$ and $61^d$ are adjusted so as to insert as much resistance in the field circuit as is necessary to give the desired speed, and it will be evident from an inspection of the drawing that as the field resistance is increased to increase the speed of the motor in one direction, the extra resistance of the starter which next comes into operation, when the current is reversed, will be increased, and this increase in the extra resistance may be substantially in proportion to the increase in the speed of the motor above the normal speed. If, on the other hand, either of the rheostat arms $61^c$ or $61^d$ is moved to cut out all of the field resistance, it will, at the same time, cut out all of the variable armature resistance and leave in circuit only the fixed resistance $R^4$ or $R'$, which will be sufficient to protect the motor at the time of reversal of the current, since at this moment the motor will be operating at normal speed, and its voltage, added to the line voltage, will be less than twice the normal voltage of the line.

It will be unnecessary to describe in detail the operation of all of the parts in Fig. 2, since the operation is exactly the same as in Fig. 1 except for the changes above noted whereby the extra armature resistance controlled by one starter is adjusted by the rheostat arm associated with the field switch which is controlled by the other starter. It will be evident with the arrangement described in Fig. 2, the motor may be operated at its lowest speed in one direction and at its highest speed in the opposite direction, or at any desired speed above the normal, and that the starter which comes into action when the current is reversed will always have the proper amount of armature resistance in circuit to protect the motor against the excessive flow of current through its armature and to permit a current equal to the maximum starting current to flow through and cause a quick reversal of the direction of rotation of the armature.

In Fig. 3 of the drawing the elements and the circuits are the same as in Fig. 1 except as to the field resistance and the operation of the field controlling switches. As shown in the drawing, instead of having two separate field resistances, as in Fig. 1, there is, in Fig. 3, a rheostat $r^3$ provided with two contact arms $61^e$ and $61^f$, which are, in practice, mounted upon the same pivot and insulated from one another, although shown separate in the drawing for the purpose of clearness. The rheostat arm $61^e$ is connected by conductor 80 to the field circuit 60 at the right of the switch H, and the arm $61^f$ is connected by conductor 81 to the field circuit between the switches H and H', as shown in the drawing. One end of the rheostat $r^3$ is connected by conductor 82 to the field circuit, at the left of the field switch H'. An additional contact 83 is arranged to be engaged by the contact bar 52 of the switch H when the latter is energized, and this contact is connected by a wire 84 to the conductor 65 leading from the contact $49^a$ of starter $G'$ to the solenoid winding $h'$ of field switch H'.

In Fig. 3, the operation of the master switch, start-and-stop switch, tappet switch, direction switches and starters, is the same as in Fig. 1, and it will therefore only be necessary to describe in detail the operation of the field controlling switches. With the arms $61^e$ and $61^f$ in the positions shown, the operation is as follows: After the engagement of the tappet blade with the contact 16 and the closure of the direction switch D and the operation of the starter G, the field switch H is energized by current flowing from the side L of the supply circuit through the conductor 26 and the starter arm 45 to the contact 49, thence through conductor 50 to the coil $h$ and thence through conductor 51 to the side $l'$ of the supply circuit. The current in the coil $h$ causes its core to lift, thereby lifting the bridge-piece 55 out of engagement with the contacts 56 and 57, and causes the current in the field circuit 60 to take its course through the conductor 80, arm $61^e$, that portion of the resistance $r^3$ which is included between the arms $61^e$ and $61^f$; and from the latter arm the current flows through conductors 81 and 60, contact $56^a$, bridge-piece $55^a$, contact $57^a$ and conductor 60 to the field winding F', and thence to supply wire L'. A portion of the resistance $r^3$ is thus included in the field circuit. As the bridge-piece 52 engages the contacts 53 and 54, the series field F is short circuited and at the same time said bridge-piece engages the contact 83, thereby closing a circuit through the coil $h'$ of the field switch H', as follows: from the supply wire L' through conductor 51 to the contact 54, thence through bridge-piece 52 and contact 83 to conductor 84; thence through conductor 65 to the coil $h'$, thence through conductors 64 and 37 to the side L of the supply circuit. This causes the switch H' to lift its core and move the bridge-piece $55^a$ away from the contacts $56^a$ and $57^a$ so that the current for the field, instead of flowing through the arm 61ᶠ and said contacts and bridge-piece, will flow from the arm 61ᵉ through all of the resistance included between said latter arm and the first contact 85 of the field resistance. It will be evident, therefore, from the foregoing description that in one direction of rotation the field resistance will be inserted by two separate steps, one part of the resistance being inserted the moment the bridge-piece 55 moves away from the contacts 56 and 57, the other part (between the arm 61ᶠ and the contact 85) being inserted a moment thereafter when the switch H' lifts its bridge-piece 55ᵃ away from the contacts 56 and 57. Although the interval of time between the lifting of the field controlling switches is small, yet it is of material advantage to insert the resistance by two steps instead of one, where a considerable amount of resistance is to be inserted in the field circuit of the motor. For operating in the reverse direction, at a lower speed, it is unnecessary to insert the resistance by successive steps and therefore the arrangement is such that the resistance controlling switch H' operates alone, for one direction of rotation of the motor. Thus, when the direction switch D' closes and the starter G' operates, the coil h' of the field controlling switch H' is energized in the same way as in Fig. 1, and when the bridge-piece 55ᵃ is lifted the current for the shunt field flows from the line L through conductor 60, contact 56, bridge-piece 55, contact 57, to conductor 81 and contact arm 61ᶠ, thence through that portion of the resistance $r^3$ which is included between said arm and the contact 85, thence through conductor 82 to the wire 60 and thence through the shunt field of the motor to the supply wire L'. It will be evident that by varying the positions of the contact arms 61ᵉ and 61ᶠ, the speed of the motor may be changed at will.

In the apparatus above described, and illustrated in Figs. 1, 2 and 3, there are two starters, one for each direction of rotation of the armature, and this is the preferred arrangement, since while one starter is energized, or in the running position, the other starter is deënergized, and in the starting position, ready for operation the instant the current in the armature circuit is reversed; hence there is no time lost in waiting for the starter to move from the running to the starting position at the time of reversing the current, as would be the case if a single starter were used, and, also with the two starters, one always ready for action, the armature will always be protected by the starting resistance at the time when the current in its circuit is reversed.

In Fig. 4 of the drawing, I have shown an arrangement which embodies only one starter and connections are provided whereby this starter and the field controlling switches will always return to their normal positions during the movement of the tappet switch handle from either one of its extreme positions to its central position. This is accomplished by extending the circuit which includes the shunt windings of the starter through contacts which are connected by the operating arm of the tappet switch, in the extreme positions of said arm, but which are disconnected when the arm is moved toward its central position.

In Fig. 4, the master switch, the start-and-stop switch, the direction switches and the circuit through the coils of the latter switches, controlled by the tappet switch blade e, are the same as in the previously described figures. A single starter G² is shown, and the circuit for the armature through this starter is as follows: from the side L of the supply circuit through conductor 26 to the arms 44ᵇ and 45ᵇ of the starter and also from conductor 26 through coil 27ᵇ, extra resistance R', coil 28ᵇ, starting resistance R² to contact 90, and through conductor 91 to the movable contact 92 of the direction controlling switch D'. Opposed to the contact 92 is a stationary contact 94 connected by conductor 33ᵃ to the contact 11 of the master switch, and from thence the armature circuit proceeds through the arm b' of the master switch and conductor 32 to the armature, thence through conductor 31 to the contact which is opposed to the movable contact 96 on the direction switch D', the latter contact being connected, as shown, by wire 97 to the series field winding F of the motor, and thence to the side L' of the supply circuit. Hence, when the switch D' is closed the armature circuit will be completed through the course just traced. The conductor 91 leading from the starter is also connected to a movable contact 98 on the direction switch D, and opposed to this contact is a stationary contact 99 connected by wire 100 to the conductor 31, from whence the circuit may be traced through the armature to conductor 32, to arm b' of the master switch, to contact 11 and through conductor 33ᵃ to a stationary contact 101 opposed to a movable contact 102 on the direction switch D, said latter contact being connected by conductor 103 to the wire 97 leading to the series field winding F and the supply wire L'.

As in the previously described figures, when either one of the direction switches closes it completes the armature circuit in one direction or the other, and it also completes the circuit through the shunt or holding coils of the starter; but in Fig. 4 this latter circuit extends through switch contacts which are connected by the handle of the tappet switch when the latter is in either one of its extreme positions, this connection being broken when the handle is moved toward its central position. The circuit for the holding coils of the starter is traced as follows: from the supply wire L through conductor 26 to the holding coil $40^b$, conductor 104, holding coil $39^b$ and conductor 105 to an arcuate contact piece 106 arranged concentrically with the axis of the handle $e'$ of the tappet switch, on which handle is secured the contact piece 107 for engaging the contact piece 106 in all positions of the handle. Contact pieces 108 and 112 are arranged so that they will be engaged by the contact piece 107 in the extreme positions of the handle, but not in the intermediate position of the handle. When the handle is in the position shown in the drawing, the circuit for the holding coils of the starter extends through contacts 106, 107 and 108 to conductors 109 and 110, to contact $25^b$, and, the direction switch D then being closed, through bridge-piece $23^b$ to contact $24^b$ and thence by conductor 103 to conductor 97 which leads through the series winding F of the motor to the side L' of the supply circuit. In the other extreme position of the handle $e'$, the contact piece 107 will connect the stationary contacts 106 and 112, and the blade $e$ will engage the contact 17. The direction switch D will then be open and the direction switch D' closed, and the circuit through the holding coils of the starter will be completed as follows: from the contact 106 through contact piece 107 and stationary contact 112 to conductors 113 and 114, thence through contact $24^c$, bridge-piece $23^c$ and contact $25^c$ to conductor 97, and thence through the series field winding F to the side L' of the supply circuit.

It will be plain from the course of the holding coil circuit just described, that as the handle of the tappet switch is moved from one of its extreme positions by the operation of the machine driven by the motor, the circuit through the holding coils of the starter will be broken during the first part of the movement of the tappet handle, and the starter arms will have time to fall to their normal positions, to include the resistance in the armature circuit before the blade $e$ of the tappet switch changes position and causes the deënergization of one direction switch and the energizing of the other direction switch to cause a reversal in direction of the armature current.

As in the previously described figures, the operation of the field controlling switches is controlled by the starter. When the last section of resistance is cut out of the armature circuit by the closing of the starter arm $45^b$, a circuit is completed through the coil of one or the other of the field controlling switches H or H', and when the circuit through the holding coils of the starter is broken at the tappet switch and the starter arms return to normal position, the circuit through the coil of the field controlling switch is broken at the starter. Thus, the closure of the tappet switch against contact 16 causes the direction switch D to close, and as the motor armature reverses and the current becomes normal, the starter arms close, and the coil of the field controlling switch H is energized by current flowing through a circuit as follows: from supply wire L through conductor 26, arm $45^b$ of the starter, contact $49^b$, conductor 115, coil $h$, conductors 116 and 110 to contact $25^b$, bridge-piece $23^b$, contact $24^b$, conductors 103 and 97, through series field F to the supply wire L'. The field resistance $r'$ is thereby included in the shunt field circuit and the series winding F of the motor is short-circuited by the switch H. When the tappet switch swings to the opposite position so that its blade $e$ engages the contact 17 and its contact piece 107 breaks connection with the contact 108 and engages the contact 112, the holding coils of the starter will be deënergized at the commencement of such movement and the starter arms will return to normal position, opening the circuit of the coil $h$ of the field switch H at the contact $49^b$, and in the latter part of the movement of the tappet switch the direction switch D' will be energized and the holding coils of the starter will be energized, and, after the starter has operated to cut the resistance out of the armature circuit, the circuit will be closed through the coil of the field controlling switch H', as follows: from the supply wire L' through conductor 26, arm $45^b$, contact $49^b$, conductor 115, coil $h'$, conductors 117 and 114 to contact $24^c$, bridge-piece $23^c$, contact $25^c$, conductor 97 and series field F to the supply wire L'. The resistance $r^2$ will then be inserted in the shunt field circuit of the motor and the series winding of the motor will be short-circuited by the switch H'.

Preferably the tappet switch and its contacts are arranged so that the handle 108 can be moved a considerable distance off the contacts 108 and 112 before the spring on the switch swings over the pivotal point of the switch and causes the tappet blade $e$ to move. This is for the purpose of safety of operation, to give the starter and field controlling switches time to resume their normal positions before the armature current is reversed, and also to permit the operator to slow down the motor, below its normal speed, if desired, by moving the tappet switch handle far enough to deënergize the holding coils of the starter without causing the tappet blade $e$ to leave the contact against which it rests and cause a reversal of the armature current. If the handle of the tappet switch is moved far enough to break the circuit through the holding coils, without disturbing the blade e, the arms of the starter will fall to normal position and the armature resistance will be inserted in series with the armature. This latter operation will rarely take place but may at times be desirable.

What I claim is:

1. In a motor control system, a master switch in the armature circuit, a control circuit for the master switch, a start-and-stop switch in said latter circuit, two direction switches for opening and closing the armature circuit and for reversing the direction of current through the armature, said direction switches having independent actuating coils, a control circuit connecting said coils to one side of the supply circuit through the master switch, and a tappet switch adapted to connect said coils alternately to the opposite side of the supply circuit.

2. In a motor control system, the combination with a motor and a master switch in the armature circuit thereof, of two current controlled starters, each starter having a resistance in excess of the normal starting resistance, and a reversing mechanism adapted to reverse the current through the armature and to connect said starters alternately with the current source.

3. In a motor control system, the combination with a motor and a master switch in the armature circuit thereof, of two current controlled starters, each starter having a resistance in excess of the normal starting resistance, and a reversing mechanism adapted to reverse the current through the armature and to connect said starters alternately with the current source, said reversing mechanism comprising two actuating coils, a control circuit including said coils and a tappet switch for completing the circuit through said coils alternately.

4. In a motor control system, the combination with a motor of two double-pole direction switches for controlling the direction of current through the motor and two current controlled starters having circuits adapted to be connected to the current source by said direction switches, respectively, each of said starters having resistance in excess of the normal starting resistance.

5. In a motor control system, the combination with a motor of two double-pole direction switches for controlling the direction of current through the motor and two current controlled starters having windings adapted to be connected in series with the armature by said direction switches, respectively, each of said starters having resistance in excess of the normal starting resistance.

6. In a motor control system, the combination with a motor of two double-pole direction switches for controlling the direction of current through the motor and two current controlled starters having series windings adapted to be connected in series with the armature and holding windings adapted to be connected to the current source by said direction switches, respectively, each of said starters having resistance in excess of the normal starting resistance.

7. In a motor control system, the combination with a motor and means for reversing the direction of current through the same, of a current controlled starter adapted to be connected to the current source by said reversing means, and a field switch controlled by said starter and adapted to weaken the field after the starter has operated to cut out the armature resistance.

8. In a motor control system, the combination with a motor and means for reversing the direction of current through the same, of two current controlled starters, one for each direction of rotation, and two field switches controlled by said starters, respectively, and adapted to weaken the field of the motor when the starters have operated to cut out the armature resistance.

9. In a motor control system, the combination with a motor of two double-pole direction switches for controlling the direction of current through the motor and two current controlled starters having circuits adapted to be connected to the current source by said direction switches, respectively, each of said starters having resistance in excess of the normal starting resistance, and means controlled by said starters for weakening the motor field after the starters have operated to cut out the armature resistance.

10. In a motor control system, the combination with a motor of two direction switches for reversing the current through the armature, two starters controlled by said direction switches, respectively, and two field controlling switches controlled by said starters, respectively.

11. In a motor control system, the combination with a motor of two direction switches having actuating coils, a control circuit for said coils, a tappet switch for completing the circuit through said coils alternately, two starters controlled by said direction switches, respectively, and means controlled by said starters for weakening the field of the motor.

12. In a motor control system, the combination with a motor of two direction switches having actuating coils, a control circuit for said coils, a tappet switch for completing the circuit through said coils alternately, two starters controlled by said direction switches, respectively, and two field switches controlled by said starters, respectively, for weakening the field of the motor after the starters have operated to cut out the armature resistance.

13. In a motor control system, the combination with a motor, of means for reversing the current through the armature, two starters controlled by said reversing means, a field resistance, two field-controlling switches controlled by said starters and adapted to insert different portions of the resistance in the field circuit, and two manually adjustable devices for regulating the amount of field resistance inserted by said field-controlling switches.

14. In a motor control system, the combination with a motor and means for reversing the current in the armature circuit thereof, of two starters adapted to be included alternately in said circuit by the reversing means, each starter comprising an extra resistance and a normal starting resistance and two current-controlled elements for cutting out said resistances successively, said elements comprising independently movable switch-arms and magnet windings in series with said resistances.

15. In a motor control system, the combination with a motor and means for reversing the current in the armature circuit thereof, of two starters adapted to be included alternately in said circuit by the reversing means, each starter comprising an extra resistance and a normal starting resistance and two current-controlled elements for cutting out said resistances successively, said elements comprising independently movable switch-arms and magnet windings in series with said resistances, two field-controlling switches having actuating coils, and circuits for said latter coils adapted to be closed by the starters.

16. In a motor control system, the combination with a motor and means for reversing the current in the armature circuit thereof, of two starters adapted to be included alternately in said circuit by the reversing means, each starter comprising an extra resistance and a normal starting resistance and two current-controlled elements for cutting out said resistances successively, said elements comprising independently movable switch-arms and magnet windings in series with said resistances, a resistance in the field circuit of the motor, field-controlling switches each normally short-circuiting a portion of said resistance, said latter switches having actuating coils, and circuits for said coils adapted to be closed by said starters.

17. In a motor control system, the combination with a motor and means for reversing the armature current, of two starters adapted to be connected alternately to the armature through the reversing means, one of said starters having an armature resistance in excess of the normal starting resistance, a variable field resistance, means operating in conjunction with the other starter for including the field resistance in the field circuit of the motor, and means for varying the amount of said excess armature resistance in circuit in accordance with the amount of field resistance in circuit.

18. In a motor control system, the combination with a motor and means for reversing the armature current, of two starters adapted to be connected alternately to the armature through the reversing means, both of said starters having an armature resistance in excess of the normal starting resistance, two variable field resistances, two field-controlling switches, one operating in conjunction with each starter, for including the field resistances in the field circuit of the motor, and means for varying the amount of excess resistance in each starter in accordance with the variations in the field resistance controlled by the field switch associated with the other starter.

19. In a motor control system, the combination with a motor and means for reversing the current through the armature of the same, of two starters, one for each direction of rotation, each starter having series windings adapted to be included in the armature circuit by the operation of the reversing means and having resistance in excess of the normal starting resistance, two field resistances controlled by said starters, respectively, and manually operated means for varying the field resistance controlled by one starter and for simultaneously varying the armature resistance controlled by the other starter.

In testimony whereof I affix my signature, in presence of two witnesses.

GEORGE H. WHITTINGHAM.

Witnesses:
 CHAS. R. DURLING,
 A. AHRLING.